(12) United States Patent
Coutsomitros et al.

(10) Patent No.: US 6,465,800 B1
(45) Date of Patent: Oct. 15, 2002

(54) DIFFERENTIAL TRANSDUCER FOR MEASURING THE CURVATURE VARIATIONS OF A SURFACE

(75) Inventors: Constantin Coutsomitros, Ranco (IT); Efthymios Koltsakis, Thessaloniki (GR)

(73) Assignee: European Community (EC), Luxembourg ( * ) Notice: Subject to any disclaimer, the term of this patent is extended or adjusted under 35 U.S.C. 154(b) by 0 days.

(21) Appl. No.: 09/647,136

(22) PCT Filed: May 26, 1999

(86) PCT No.: PCT/EP99/03652

§ 371 (c)(1), (2), (4) Date: Sep. 27, 2000

(87) PCT Pub. No.: WO99/63303

PCT Pub. Date: Dec. 9, 1999

(30) Foreign Application Priority Data

Jun. 2, 1998 (EP) .............................. 98109982

(51) Int. Cl.$^7$ .............................................. G01N 21/86
(52) U.S. Cl. .................. 250/559.22; 250/559.4
(58) Field of Search ..................... 250/559.22, 559.4, 250/216; 356/239.3, 239.7, 237.2

(56) References Cited

U.S. PATENT DOCUMENTS

| 4,815,855 | A | 3/1989 | Dixon | 356/358 |
| 4,859,861 | A | * 8/1989 | Mersch | 250/559.22 |
| 5,128,537 | A | 7/1992 | Hälg | 250/231.19 |
| 5,447,075 | A | 9/1995 | Hockaday | 73/862.59 |

FOREIGN PATENT DOCUMENTS

| DE | 1 171 173 | 5/1964 |
| EP | 0 843 157 | 5/1998 |

* cited by examiner

*Primary Examiner*—Que T. Le
(74) *Attorney, Agent, or Firm*—Sughrue Mion, PLLC

(57) ABSTRACT

A differential transducer for measuring the curvature variations of a surface such as the surface of a diaphragm (5). The transducer includes an assembly of two L-shaped optical elements (6, 7) having first legs (8) intended to be mounted on the surface in such a way that the outer faces of both second legs (9) extend substantially in parallel to each other and at a right angle away from the surface, an optical cavity (19) defined therebetween, a laser source (17) having a beam (16) directed parallel to the surface onto the assembly and perpendicularly to the outer faces of the second legs (9), and a photodetector (18) for receiving the beam after having passed through the cavity (19). The optical elements (6, 7) are provided with three support tips (10, 11, 12) firmly applied against the surface and arranged at the corners of an equilateral triangle whose symmetry axis is parallel to the beam (16) axis, one of the support tips (10) on the symmetry axis being located close to one of the second legs (9).

8 Claims, 2 Drawing Sheets

DIFFERENTIAL TRANSDUCER FOR MEASURING THE CURVATURE VARIATIONS OF A SURFACE

BACKGROUND OF THE INVENTION

This invention refers to a differential transducer for measuring the curvature variations of a surface, such as a diaphragm surface.

The variation of the curvature of a surface can be due to mechanical bending forces, and especially in the case of a diaphragm due to the differential pressure on both sides of this diaphragm. A perfect knowledge of the variations of the curvature of such a body therefore procures informations on the value of these forces or said pressure difference.

The detection of the diaphragm deformation uses in general electrical circuits in which an inductance or a capacitance element changes its impedance under the influence of the deformation of the diaphragm. These techniques however have limited accuracy and a restricted dynamic range. In order to increase this range a series of sensing devices having scaled sensitivity must be implemented.

Interferometry has been used for the measurement of mechanical elongation by measuring the elongation of an optical fibre which is firmly secured to the surface undergoing deformation. The length of the optical fibre is measured by optical interferometric setups. It seems impossible to embed fibres in a differential pressure measurement diaphragm without falsifying the elastic characteristics of the diaphragm and consequently the calibration of the transducer. The accuracy of this technique is thus rather poor.

The object of the invention is to propose a differential transducer for measuring the curvature variations of a surface with enhanced accuracy and sensitivity range.

SUMMARY OF THE INVENTION

This object is achieved by the differential transducer as defined in claim 1.

The improvements as defined in claims 2 to 5 are intended to reduce the error due to the presence of the transducer on said surface.

The invention will now be described in detail by means of preferred embodiments and the attached drawings.

DETAILED DESCRIPTION OF THE INVENTION

Figure 1:
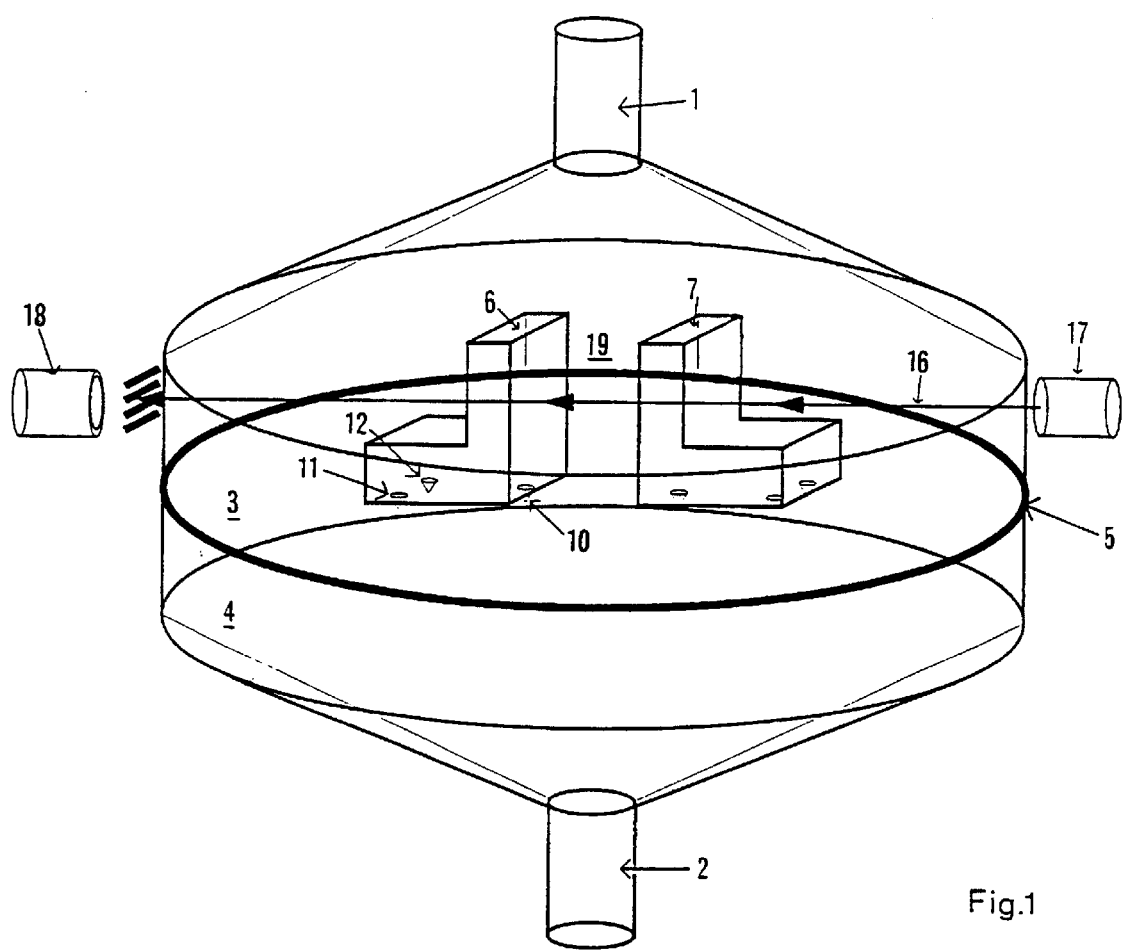
FIG. 1 is a perspective and schematic view of a differential pressure transducer according to the invention.

The transducer is shown in FIG. 1 applied to a conventional device for measuring the differential pressure between two fluids. These fluids are supplied via ducts 1 and 2 respectively to chambers 3 and 4 which are located on either side of a diaphragm 5 of circular shape. This diaphragm is made of an elastic material and is subjected to axisymmetric bending deformation in accordance with the pressure difference between the fluids in the two chambers.

By measuring the curvature variations of this diaphragm an information on the pressure difference in the two chambers is obtained. The fluid in the upper chamber 3 is in general a reference fluid, for example ambient air.

Figure 2:
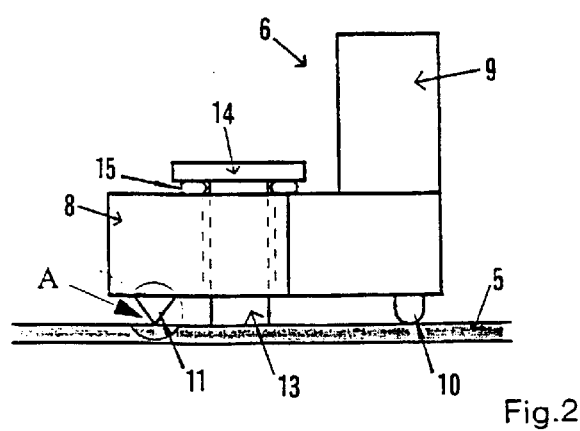
FIG. 2 represents a side view of one optical element as used in the transducer of FIG. 1.
Figure 3:
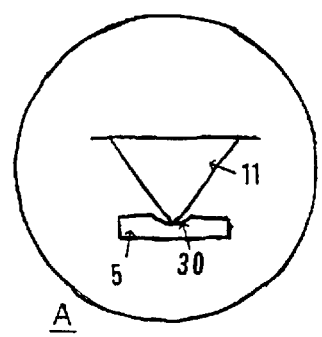
FIG. 3 is a detail of FIG. 2.

The differential transducer according to the invention for measuring these curvature variations comprises an assembly of two identical L-shaped optical elements 6 and 7 arranged symmetrically with respect to the centre of the diaphragm and fixed therto. One such element is shown in FIG. 2. It is composed of a first leg 8 which is attached to the diaphragm 5 in such a way that the second leg 9 made of a transparent material extends substantially orthogonally with respect to the diaphragm. The first leg is provided with three support tips 10, 11, 12 arranged at the corners of a symmetrical triangle, whose axis of symmetry is located in the drawing plane of FIG. 2. The support tip 10 lying exactly in the drawing plane is located close to the second leg 9 whereas the remaining support tips 11 and 12 are situated close to the free end of the first leg 8. These latter support tips are pointed and are received in notches 30 of the diaphragm 5 as can be better seen from FIG. 3. The support tip 10 is not pointed but has a rounded end intended to allow a restricted sliding movement on the diaphragm 5 thus avoiding the mechanical stress of the optical elements due to elastic deformation of the diaphragm 5.

Each optical element is fixed to the diaphragm 5 by means of a bolt 13 welded to the diaphragm and passing freely through the first leg 8 of the respective optical element. Its screwed head 14 presses the leg 8 via an elastic cushion 15 against the diaphragm whereby the point where the axis of the bolt intersects the diaphragm 5 is determined to ensure that the tangent plane of the deformed diaphragm in this point remains parallel to the plane defined by the three support tips 10, 11, 12.

The transducer according to the invention needs two optical elements 6, 7 as it can be seen schematically in FIG. 1. These elements are mounted on the diaphragm 5 symmetrically with respect to its centre point in such a way that their second legs delimit by their outer surfaces an optical cavity 19 there-between which under pressure-less conditions is parallelepipedic, whereas under a differential pressure it is wedge-shaped.

For clarity reasons the bolts 13 for securing the optical elements have not been shown in FIG. 1.

A laser beam 16 supplied by a laser source 17 is injected through a window (not shown) into the chamber 3 in which the optical elements are located and which is filled through the duct 1 with a transparent fluid having defined optical characteristics. The beam 16 passes parallelly to the diaphragm surface through the second legs of the elements 6 and 7 before exiting through another window (not shown) on the opposite side of the chamber. In front of this window a photodetector 18 is mounted for receiving the light which has passed through the two optical elements.

As long as the opposing large surfaces of the second legs are parallel to each other, the beam passes therethrough substantially without any modification. If however a pressure difference is present between the chambers 3 and 4, the diaphragm surface undergoes deformation and the optical cavity 19 becomes wedge-shaped. A part of the beam intensity is then reflected in the wedge-shaped optical cavity and causes interference fringes to appear on the photodetector 18. These fringes can be correlated to the radius of curvature and consequently to the pressure difference to be measured. The photodetector 18 can be of the well known single point type and can be associated to data processing means for automatically analysing the interference fringes.

Figure 4:
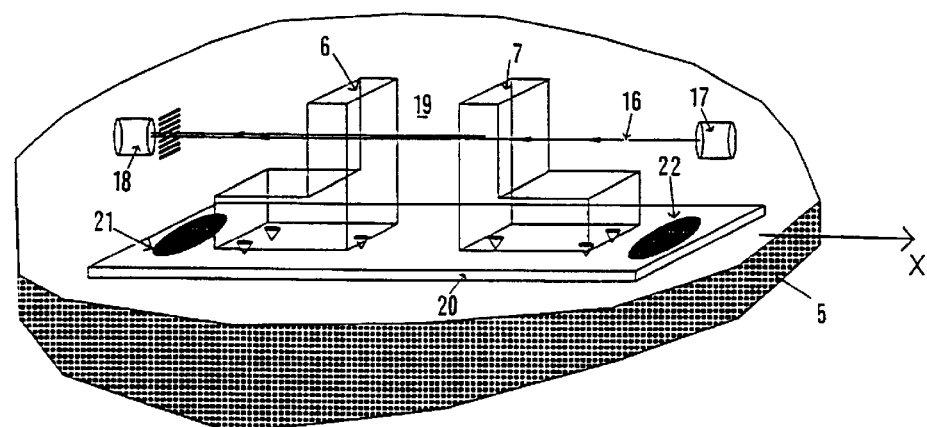
FIG. 4 shows in perspective an alternative transducer according to the invention.

FIG. 4 shows an alternative embodiment of the transducer according to the invention. Similar elements are designated by identical reference numbers. The main difference between the embodiment of FIG. 1 and that of FIG. 4 resides in the fact that the transducer of FIG. 4 is mounted on a soft base strip 20 which itself is bonded to a deformable body such as a diaphragm 5 whose curvature is to be measured. The base strip 20 is arranged either along a diameter if the curvature of a circular diaphragm 5 is to be measured, or more generally along a surface line of the diaphragm whose curvature should be measured. Two adhesive bonds 21 and 22 are arranged on both ends of the strip 20 along said line in a symmetric way.

In order to reduce the impact of the strip onto the elastic properties of the diaphragm 5 the two ends of the strip 20 are secured to the diaphragm 5 in different manners: While a first end is attached to the diaphragm 5 by employing a full adhesive bond material 21, the second end 22 is secured thereto by employing a less strong bond material 22 so as to allow a restricted movement.

In this embodiment the optical elements can be preassembled on the strip 20 thus reducing the complexity of intervention on the body whose curvature is to be measured.

Figure 5:
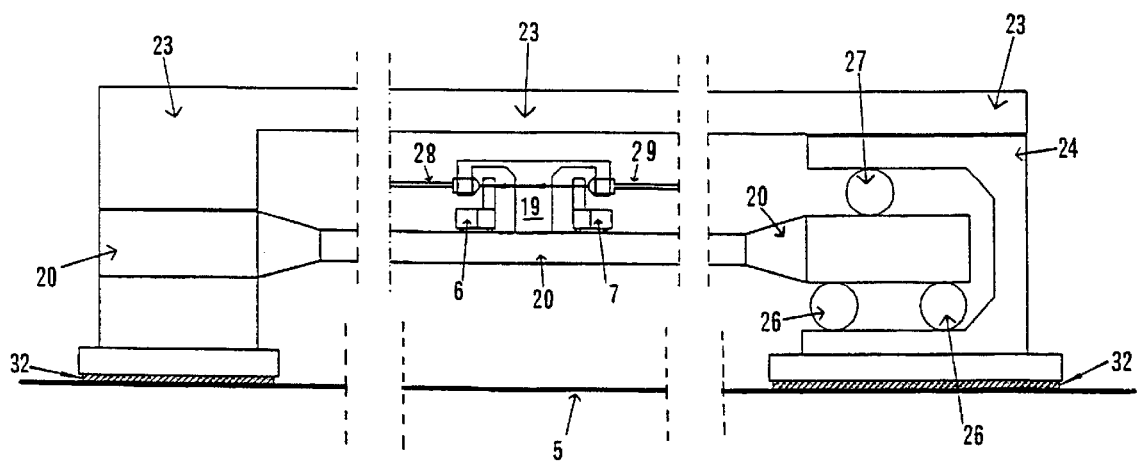
FIG. 5 shows an elevation view of still an other embodiment of the invention.

Finally FIG. 5 shows still another embodiment of the invention which distinguishes over the transducer according to FIG. 4 mainly by the fact that one end of the strip 20 bearing the optical elements 6 and 7 is not directly bonded to the diaphragm 5 but is held via balls 26, 27 by a clamping template 24 which is itself firmly bonded by an adhesive 32 to the diaphragm 5, while the other end of the strip 20 is directly bonded by means of adhesive 32 to the diaphragm 5. The template 24 comprises three balls 26 in a triangular configuration on one side of the strip 20 and a further ball 27 on the other side, whose position substantially coincides with a projection of the centre point of the triangle between the balls 26, thus allowing a restricted movement of this end of the strip under deformation conditions of the diaphragm without stretching deformations of the strip 20. During the hardening phase of the adhesives 32, this template 24 is rigidly coupled to the other end of the strip 20 by means of a further template 23 which is thereafter removed.

In this embodiment there are further shown optical fibres 28 and 29 for guiding the laser beam towards and away from the optical cavity 19 between the optical elements 6 and 7. Of course, such fibres can also be present in the embodiments described above.

The invention is not restricted to the embodiments as described. In particular, it should be noted that the study of the curvature of a body can be applied to transducers not measuring the pressure difference between two sides of a diaphragm but the bending force of a bar. This force is related to the bending amplitude and thus to the surface curvature of the bar.

It should further be noted that the transducer according to the invention can be combined with other similar transducers on a common diaphragm. This may be useful if a transducer cannot be applied directly to the centre line of the curvature to be measured. In this case two or more transducers arranged around this centre line and parallelly to each other or not may be used. The real curvature variations along the centre line can be deduced therefrom.

What is claimed is:

1. A differential transducer for measuring the curvature variations of a surface such as the surface of a diaphragm (5), characterized in that it comprises an assembly of two L-shaped optical elements (6, 7) whose first legs (8) are intended to be mounted on the surface in such a way that the outer faces of both second legs (9), which face each other and which are made from transparent material, extend substantially in parallel to each other and at a right angle away from said surface, an optical cavity (19) being defined there-between, a laser source (17) whose beam (16) is intended to be directed parallelly to said surface onto said assembly and perpendicularly to the outer faces of said second legs (9), and a photodetector (18) disposed to receive said beam after having passed through said cavity (19) and said optical elements (6, 7), each optical element being provided with three support tips (10, 11, 12) which are firmly applied against said surface and which are arranged at the corners of an equilateral triangle whose symmetry axis is parallel to the beam (16) axis, the support tip (10) on the symmetry axis being located close to the second leg (9).

2. A transducer according to claim 1, characterized in that the support tip (10) on the symmetry axis is conceived to allow limited sliding movement with respect to said surface.

3. A transducer according to claim 2, characterized in that the support tips (11, 12) away from the symmetry axis are conceived not to slide with respect to said surface.

4. A transducer according to claim 3, characterized in that the support tips (11, 12) away from said symmetry axis are accommodated in complementary notches (30).

5. A transducer according to claim 1, characterized in that it is mounted on a soft base strip (20) whose first end (21) is intended to be firmly secured to said surface whereas the second end (22) is intended to be bonded to said surface in a manner which allows restricted relative movement.

6. A transducer according to claim 5, characterized in that said second end of the strip (20) is captured in a clamp (24) via balls (26, 27).

7. A transducer according to claim 1, characterized in that each optical element (6, 7) is urged against said surface by a pressure means (13, 14, 15, 27) which applies a force whose vector is perpendicular to said surface and intersects the centre of said triangle between the tips so that the pressure means does not rotate with respect to the optical element (6, 7) when the diaphragm (5) undergoes axisymmetric bending.

8. A transducer according to claim 7, characterized in that said means consist of a bolt (13) which passes freely through the first leg (8) of the respective optical element (6, 7) and is secured to said surface or the base strip (20) and whose head (14) pushes an elastic cushion (15) against said first leg (8).

* * * * *